United States Patent [19]

Reisgies

[11] 4,222,346
[45] Sep. 16, 1980

[54] MILK LINE BACK FLUSHING METHOD AND APPARATUS

[76] Inventor: Rolf W. Reisgies, 606 Cooper Rd., Waunakee, Wis. 53597

[21] Appl. No.: 964,642

[22] Filed: Nov. 29, 1978

[51] Int. Cl.³ .......................... A01J 7/00; B08B 9/00
[52] U.S. Cl. ............................. 119/14.18; 119/14.08; 134/102
[58] Field of Search ............... 119/14.18, 14.08, 14.03; 134/102

[56] References Cited

U.S. PATENT DOCUMENTS

| | | | |
|---|---|---|---|
| 2,199,821 | 5/1940 | Hapgood | 119/14.04 |
| 2,680,445 | 6/1954 | Hemminger | 134/102 |
| 3,461,845 | 8/1969 | Peterson | 119/14.18 |
| 3,713,423 | 1/1973 | Sparr, Sr. | 119/1 |
| 3,991,716 | 11/1976 | Reisgies | 119/14.08 |
| 4,034,713 | 7/1977 | Umbaugh | 119/14.18 X |
| 4,149,489 | 4/1979 | Umbaugh et al. | 119/14.18 |

*Primary Examiner*—Hugh R. Chamblee
*Attorney, Agent, or Firm*—Isaken, Lathrop, Esch, Haut & Clark

[57] ABSTRACT

After a cow has been milked out and the milking claw has been detached from the cow, the milking vacuum to the claw is shut off and a cleansing solution mixed with air is forced through a portion of the milk line and out through the claw and the teat cup inflations. The cleansing liquid may contain a disinfectant such as iodine to control the transmission of infection from cow to cow carried by the surfaces of the teat cup inflations. A blast of cleansing and drying air is provided following the cleaning cycle to force out any remaining liquid in the milk line, claw and inflations, to thereby eliminate residual disinfectant in these parts. The apparatus is capable of use with automatic detaching equipment, wherein it automatically shuts off the milking vacuum as the milking claw is detached, provides the cleansing liquid and blow out air in timed sequence, and resets to await initiation of another milking cycle.

11 Claims, 10 Drawing Figures

MILK LINE BACK FLUSHING METHOD AND APPARATUS

BACKGROUND OF THE INVENTION

1. Field of the Invention

This invention pertains generally to the field of milking equipment and automated milking systems, and particularly to apparatus for cleaning milking equipment and milk lines.

2. Description of the Prior Art

Infection of the teats and udder of a cow, known as mastitis, can be transmitted from cow to cow in the herd by the teat inflations which will be used on several cows during one milking. It has generally been infeasible for the operator to wash out the inflations after every milking with a disinfectant solution. Moreover, rinsing of the inflations and the claw with a disinfectant solution from the outside would leave residual amounts of disinfectant within the teat cup inflations, and possibly in the milk lines, which would be very difficult to remove. Such residual disinfectant could contaminate incoming milk from the following cow.

One approach to controlling the spread of mastitis from one cow to another has been to manually wash the teats and udder of the animal before each milking. An example of a mechanized apparatus for accomplishing such washing is shown in the U.S. patent to Sparr, U.S. Pat. No. 3,713,423. While cleansing of the cow's udder is helpful in minimizing the spread of mastitis, it is a time consuming operation for the milking operator. Moreover, once the teat inflations have been contaminated by a cow with mastitis, further cleansing of subsequent cows being milked does not protect them from transmission of the infection to them.

SUMMARY OF THE INVENTION

The apparatus of the invention can be used with standard mechanized milking equipment and with automatic milking detachers, and in either case provides a discharge of cleansing solution backwards through a portion of the milk line and out through the milking claw and teat cup inflations. The cleansing liquid is mixed with air and highly agitated to provide a violent scrubbing action as it is blown out. After a selected time period, flow of the liquid stops, and air under pressure is blown out through the milk line claw and teat cup inflations to force out any residual liquid and to dry the equipment from the inside. After a period of time sufficient for blow out of the lines to occur, the apparatus shuts off the flow of the air to the line and remains in a neutral position awaiting re-initiation of the milking cycle.

During back flushing and air blow out of the claw and the inflations, the milking vacuum to the claw is automatically shut off by the apparatus. All milk lines down stream of the apparatus are therefore completely isolated from the cleansing liquid. The cleansing liquid can be pure water, or a solution of water and such disinfectants as iodine, chlorine or other disinfectants or bactericides as appropriate.

The apparatus includes a milk flow back flush valve which is connected to a milk line from the milking claw, to the milking vacuum line, and to the back flush cleansing liquid input line. The back flush valve is responsive to control signals to selectively direct milk from the claw to the vacuum line, to shut off both the vacuum line and the back flush input line, and to connect the back flush input line to the milking claw while blocking the milking vacuum. The apparatus also includes a cleansing liquid control valve which receives cleansing liquid and blow out air, and which is responsive to a control signal to selective direct either a mixture of air and liquid or blow out air alone to the back flush valve.

The operations of the back flush valve and the cleansing liquid control valve are directed by a timing and control system which, upon initiation of the milking cycle, directs the back flush valve to connect the milking claw to the milking vacuum. Upon cessation of milk flow from the cow, the control system is actuated to direct the back flush valve to disconnect the milking vacuum to the milking claw and thereafter block the milking vacuum, and to move the back flush valve through a neutral position in which all ports are blocked, to the back flush position in which the output of the cleansing liquid valve is directed to the milking claw. Actuation of the control system may be manual where the cups are removed manually by an operator, or automatic detaching equipment can be connected to the control system to provide a signal thereto indicating the cessation of milk flow. The control system further provides a control signal to the cleansing liquid valve after the back flush valve is in its back flush position, to cause the valve to thereafter inject a cleansing liquid-air mixture through the back flush valve to the milking claw and teat cup inflations. After a predetermined period of time, the control system provides a signal to the cleansing liquid valve to shut off the flow of liquid therethrough, and allowing blow-out air to pass through the back flush valve to the teat cups. The control systems thereafter directs the back flush valve to move to its neutral position wherein the back flush input and the milking vacuum line, are blocked by the valve to await initiation of a further milking cycle.

In a preferred embodiment, the entire system is air operated and controlled, with the control system in particular being composed entirely of air logic. A unique back flush valve directs the inter-connection of the milking claw to either the milk line or the back flush input without allowing accidential mixing of cleansing liquid and milk. The cleansing liquid control valve is responsive to an air pressure signal to control the flow of cleansing liquid and its intermixing with the blow-out air.

Further objects, features, and advantages will be apparent from the following detailed description taken in conjunction with the accompanying drawings which illustrate preferred embodiments of the invention.

DESCRIPTION OF THE PREFERRED EMBODIMENT

Figure 1:
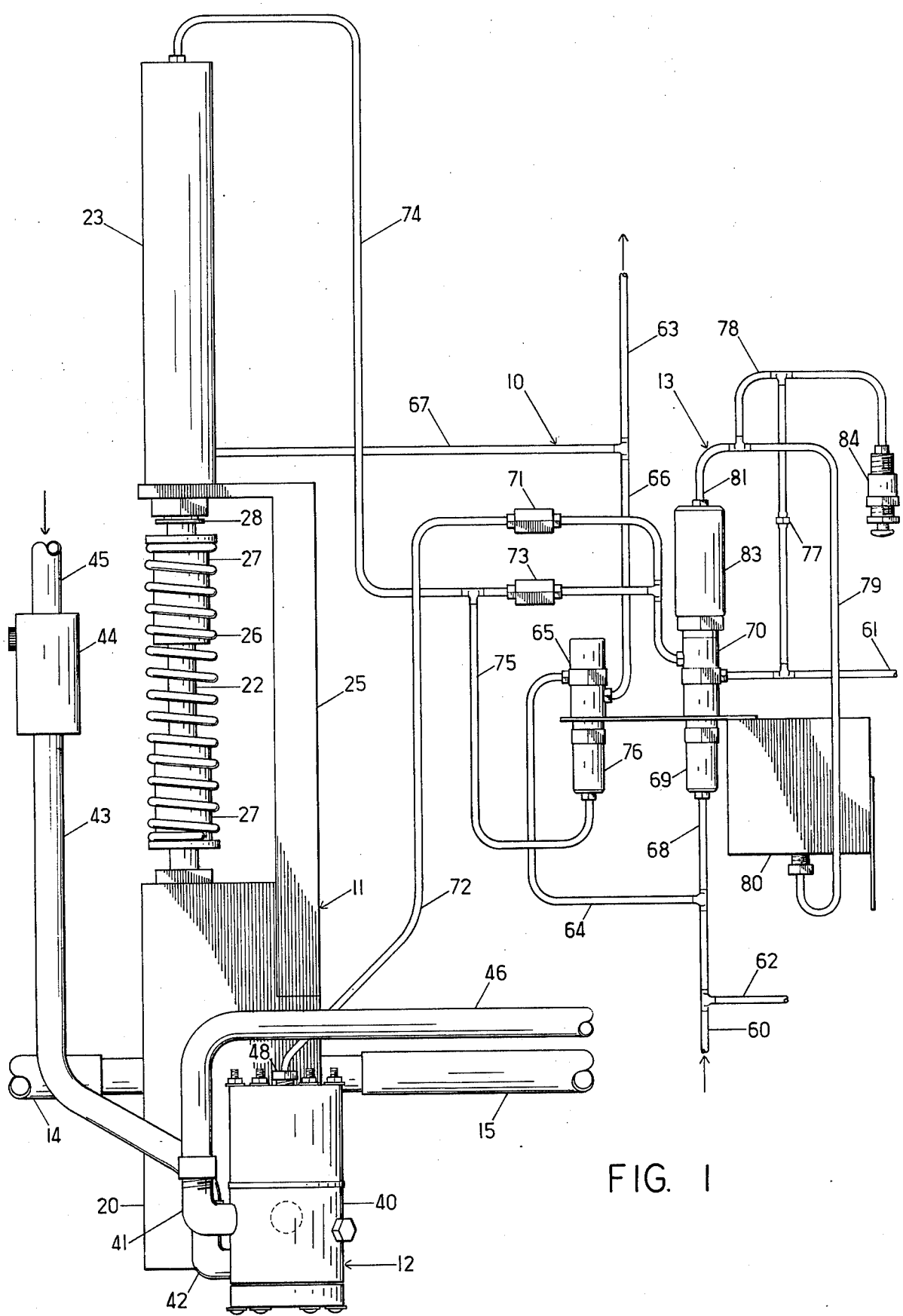
FIG. 1 is an external view of the milk line back flushing apparatus.

With reference to the drawings, wherein like numerals refer to like parts in each view, a preferred embodiment of a milking system back flushing apparatus in accordance with the invention is shown generally at 10 in FIG. 1. The back flushing apparatus includes a milk flow back flushing valve 11, a cleansing liquid control valve 12, and a back flushing operation timing and control system 13. The apparatus is adapted to connect to a standard milking system which has a milk input line 14 leading from the milking claw (not shown in FIG. 1) and a milk output line 15 connected to the source of milking vacuum. As explained further below, the back flushing apparatus is capable of being used either with standard manual take-off milking equipment, or with automated detaching equipment wherein the cessation of milk flow from the cow is sensed and the teat cup cluster automatically detached from the cow.

The milk flow back flushing valve 11 includes a valve body 20 and a valve slider 21 (not shown in FIG. 1) which slides up and down within the valve body to determine the three basic positions of the back flush valve: a milking position, a neutral position, and a back flush position. The slider 21 is connected by a shaft 22 to the piston of a two-way air cylinder 23 which is capable of driving the slider up and down. A frame member 25 mounts the air cylinder 23 to the valve body. A spring 26 is mounted around the shaft 22 between a pair of spools 27 in position to be engaged by a flange 28 rigidly mounted at a fixed position on the shaft 22. The flange 28 is out of engagement with the spring 26 and its containing spools 27 when the back flush valve is in its milking position, which is shown in FIG. 1. When the air cylinder 23 is driven in its forward direction to drive the valve slider 21 downwardly to the back flushing position, the spring 26 will provide spring pressure against the flange 28. Upon release of forward drive pressure on the cylinder 23, the spring 26 will drive the slider 21 to its neutral position wherein the flange 28 is just in contact with the end spool 27. Upon application of rearward drive pressure to the cylinder 23, the flange 28 will be driven upward out of engagement with the spool 27 until the slider 21 is in its milking position. In this position, the valve provides communication between the milk input line 14 and the milk output line 15.

The cleansing liquid control valve 12 is mounted to the back flush input port (not shown in FIG. 1) of the back flush valve body 20. When the milk flow back flush valve is in its back flush position, the back flush port will be in communication with the milk input line 14 and the milking vacuum line 15 will be blocked. The cleansing liquid valve 12 shown in FIG. 1 includes a cylindrical valve housing 40 having a blow out air input port 41 and a cleansing liquid input port 42. Cleansing liquid is provided through a hose 43 from a mixing reservoir 44 which is pressurized by a water supply line 45. The blow out air port 41 is connected to an air line 46 which preferably receives a flow of air under pressure at approximately 20 psig. The mixing reservoir 44 is preferably pressurized by the water line 45 at approximately 40 psig. static pressure and approximately 15 psig. when liquid is flowing out of the reservoir into the valve 12. The operation of the valve 12 is controlled by air pressure provided at a control input port 48. Depending on the air pressure signal received at the control port 48, the control 12 will provide the back flush input of the back flush valve with either constant pressure blow-out air or a mixture of blow out air and cleansing liquid from the reservoir 44. The cleansing liquid may be pure water for example, or a mixture of water and various disinfectants used in dairying operations, or steam. For example, a particular type of mastitis known as Myco-plasma can be effectively prevented by flushing the milking equipment, including the teat cup inflations, with a 25 parts per million iodine in water solution. Other types of cleansing liquids may also be used, for example a 4% chlorine in water solution. The concentrated disinfectant can be stored in the reservoir 44 and be picked up in the desired solution strength by the water passing through the reservoir. Alternatively, it is also possible to use ordinary water as the cleansing liquid, either hot or cold, to wash out the milk input line 14, milk claw, and teat cup inflations. Such washing will remove any debris which may have accidentally been drawn into the inflations as well as milk residue, while substantially minimizing the risk of transmission of infection from micro-organisms remaining on the inflations.

The back flush timing and control system 13 provides the necessary control signals to the back flush valve drive cylinder 23 and the cleansing liquid control valve 12 to control the operation of these devices in their proper sequence. The timing and control system shown illustratively in FIG. 1 is entirely air operated, a particularly desirable feature for use in the damp environment of the milking parlor. The apparatus is further adapted to be utilized with air controlled automatic detaching equipment such as shown in prior U.S. Pat. No. 3,991,716 to Reisgies. While such all pneumatic control circuitry is preferred, it is apparent that electrical or electronic logic could be utilized to provide the identical control functions. The construction of such logic, given the basic functions disclosed herein, will be readily apparent to those skilled in the art. Use of electrical or electronic control circuitry would require an electrical to mechanical transducer to operate the milk flow back flush valve 11 and the mixing valve 12. Solenoid operated air valves which control the flow of air to the drive cylinder 23 and the air pressure input port 48 of the cleansing liquid valve 12 can be used. Other equivalent structures will also be apparent to those skilled in the art, such as the use of solenoids or motors to drive the back flush valve and mixing valve.

The preferred embodiment of the control system 13 shown in FIG. 1 receives a high air pressure input through a "start milking" input line 60 when the milking cycle is initiated. When the milking phase has been completed, air pressure is released from the line 60 and a high air pressure signal is directed to a "stop milking" input line 61. As indicated above, the control system is particularly adapted for use with pneumatically controlled teat cup detaching apparatus. When used with such apparatus, the control system provides the start milking high pressure signal through a connecting control line 62 to the milking cycle timing apparatus, and to a connecting control line 63 which leads to the "extend for milking" input of the retract drive of the detaching apparatus. The high pressure signal on the line 60 is passed through a connecting line 64 through a two-way pilot controlled valve 65 and thence through connecting lines 66 and 67 to the retract or the rearward drive port of the drive cylinder 23. High pressure at this input port drives the back flush valve slider all the way back until the back flush valve is in its milking position. The high pressure signal from the line 60 is also provided through a connecting line 68 to the pilot drive 69 of a two-position valve 70.

When the milking cycle has been completed, and the milking claw has been removed from the cow, a high pressure signal is provided to the line 61 and the line 60 is vented to the atmosphere. The pressure signal on the line 61 passes through the valve 70 and thence through a restrictor 71 and a connecting line 72 to the pressure signal input port 48 of the cleansing liquid control valve 12. The pressure signal also passes through a second restrictor 73 and a connecting line 74 to the forward drive input port of the back flush valve drive cylinder 23. The air passing through the restrictor 73 is also directed through a connecting line 75 to a pilot drive 76 which controls the switching of the valve 65. The high air pressure signal on the line 61 is also provided through a fixed restrictor 77 and connecting lines 78 and 79 to an air volume chamber or accumulator 80. Air pressure in the line 78 is also provided through a connecting line 81 to a trigger pressure pilot drive 83 which is set to shift the valve 70 at a preselected pressure level. An optional pressure release valve 84 is in communication with the line 78 to allow the pressure within the air accumulator 80 to be vented when desired by the operator, thereby restarting the back flush timing cycle.

BACK FLUSH OPERATING SEQUENCE

Figure 2:
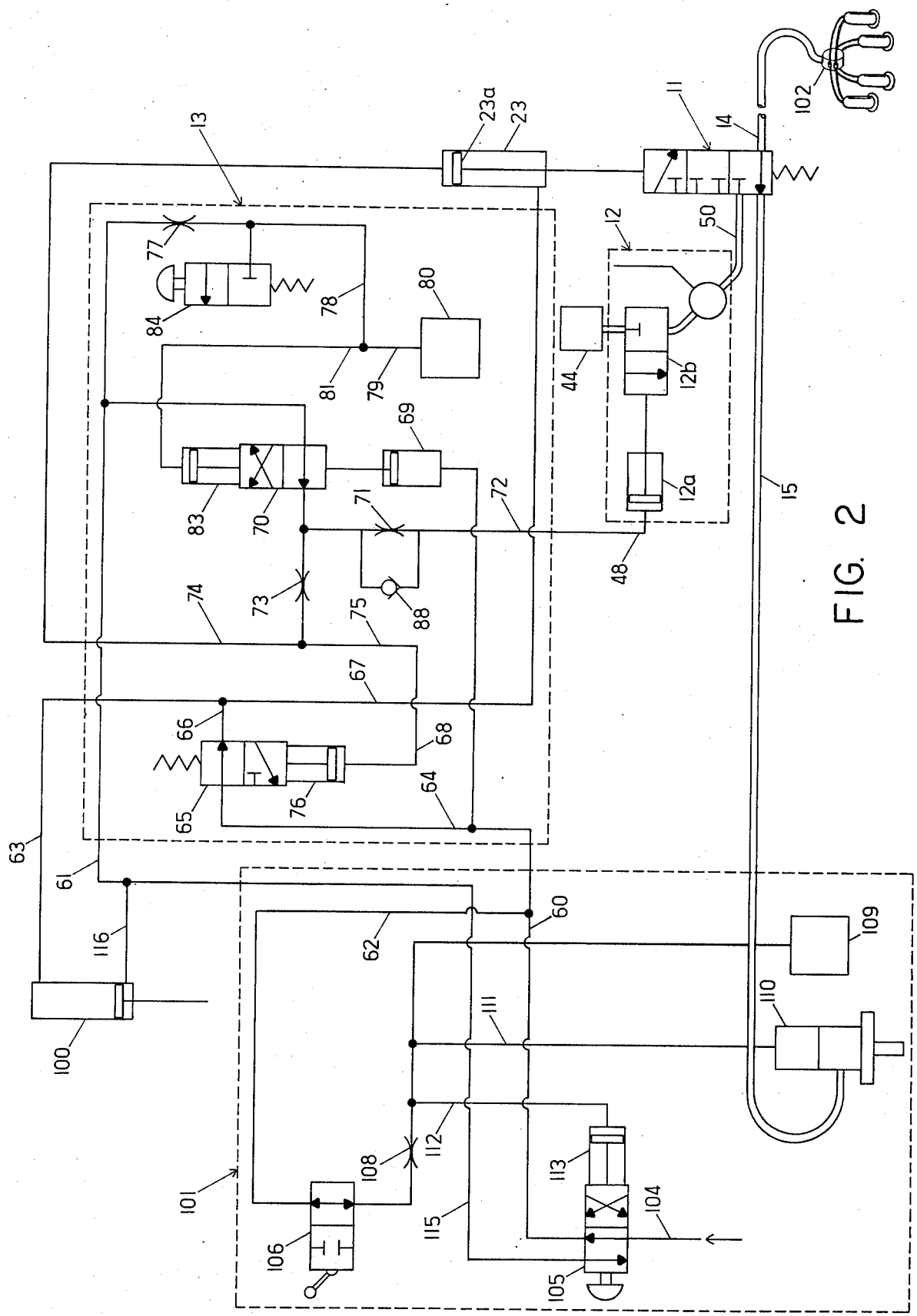
FIG. 2 is a somewhat simplified schematic view of an air control circuit for controlling the operations of the back flushing apparatus, shown in conjunction with the controls for a pneumatic teat cup detaching apparatus.

The operation of the back flush system and its operating sequence is best illustrated with reference to the schematic diagram of FIG. 2 showing the control logic of the system. For purposes of illustration, the back flush timing and control system 13 is shown connected to a detacher drive cylinder 100 and a pneumatic control circuit for the detacher operation which is shown generally within the dashed lines labeled 101 in FIG. 2. The milking cluster is shown in simplified form for illustration at 102.

The pneumatic control logic shown within the dashed lines 101 is generally similar to that shown in U.S. Pat. No. 3,991,716. This system provides high pressure (approximately 70 psig.) control air to an input line 104 which is connected to a manually actuated main control valve 105. When the main control valve 105 is in the start milking cycle position, the high pressure is directed to and through the input line 60 to the back flush control and timing system, and also through the connecting line 62 to an operator actuated two position control switch 106. The switch 106 allows the operator to operate the system in either a manual detach mode or an automatic detach mode. After passing through the switch 106 in its automatic position, the high pressure signal passes through a restrictor 108 to a timing chamber 109. A milk flow sensor 110 is connected in the milk line 15 and has an output port connected through an air line 111 which is in communication with the timing chamber 109. The milk flow sensor 110 releases the pressure in the timing chamber 109 as surges of milk pass through the sensor. The timing chamber 109 is also in communication through a connecting line 112 to a pilot drive 113 which is set to switch the position of the main valve 105 when the pressure on the pilot drive piston exceeds a predetermined level. When sufficient milk no longer passes through the milk flow sensor 110 to release the presssure in the timing chamber 109, the pressure therein builds up beyond the predetermined trip level of the pilot drive 113, and the drive thereby switches the main valve 105 to its retract position. In this position, the high pressure air from the input line 104 is connected to an air line 115 which extends up to connection with the stop milking input line 61. The line 115 also provides air to a connecting line 116 to move the piston of the drive cylinder 100 in the retract direction, thereby detaching the milking claw from the cow.

Upon initiation of the milking cycle, air pressure from the line 60 passes through the valve 65, which is spring biased to its open position, to the connecting line 66 and thence to the air lines 63 and 67. Pressure in the line 63 moves the piston of the drive cylinder 100 into its extended position to allow the teat cups to be attached to the cow, while pressure in the line 67 drives the piston 23a of the back flush drive cylinder 23 in its rearward direction to move the back flush valve 11 to its milking position. In the milking position, communication is provided between the milk input line 14 and output line 15, whereas the back flush input port 50 is blocked. High pressure air from the line 60 is also directed through the connecting line 68 to the pilot drive 69 which drives the valve 70 to its flow through position shown in FIG. 2.

Upon completion of milking, the milk flow sensor 110 will allow sufficient pressure to build up to cause the main valve 105 to be switched to its position alternate to that shown in FIG. 2. In this position, the line 60 is vented to the atmosphere and the air control line 115 provides high pressure air to the retract cylinder line 116 and to the stop milking input line 61 of the back flush control system. High pressure air from the line 61 is directed through the valve 70 and passes at a slow rate through the restrictors 71 and 73. Air passing through the restrictor 73 and connecting line 75 causes the pilot drive 76 to be slowly switched to its position alternate to that shown in FIG. 2, wherein communication of the air lines 64 and 66 is blocked and the line 66 is vented to the atmosphere. Switching of the valve to this position prevents the operator from accidentially or intentionally restarting the milking cycle, since in this position air cannot be supplied to extend the retract cylinder 100 to its milking position. Air from the restrictor 73 also passes through the connecting line 74 to the forward drive input port of the back flush valve drive cylinder 23, thereby relatively slowing driving the slider of the back flush valve through the neutral intermediate position to the back flushing position, wherein the back flush input port 50 is in communication with the milking input line 14 and the milk output line 15 is blocked. It is preferred that the switching of positions of the back flush valve occur over a 3 to 5 second period. High pressure air is also at the same time passing through the restrictor 71 to the air line 72 and thence to the control input port 48 of the pilot drive portion 12a of the cleansing liquid control valve 12. It is understood that the representation of the control valve shown within the dashed lines labeled 12 in FIG. 2 is for schematic purposes only, and that the actual construction of the valve in its preferred embodiment will be explained in greater detail below. At a sufficient presssure, the pilot drive 12a switches a two position valve portion 12b from a position in which the flow of liquid from the reservoir 44 is blocked, to a position wherein the liquid is passed to a mixing chamber to be mixed with the low pressure blow out air. The switching of this valve preferably takes 5 to 7 seconds from the time that the back flush cycle is initiated. As long as pressure is supplied on the pilot drive 12a, liquid will be mixed with blow out air and passed vigorously through the back flush input port 50 and thence through the milk line 14 and milking claw 102.

The timing of the back flushing sequence is controlled by high pressure air from the line 61 passing through the timing restrictor 77 and connecting lines 78 and 79 to the timing chamber 80. Air pressure slowly builds up within the timing chamber 80 until it exceeds the pressure level at which the pilot drive 83 trips, whereupon the position of the valve 70 is changed to that opposite to that shown in FIG. 2. The lines on both sides of the valve 70 are then vented to the atmosphere. It is preferred that the various parts be sized and matched such that approximately 40 seconds are required to build up pressure sufficient to trip the pilot drive 83. The restrictor 71 has a check valve 88 connected in parallel therewith. Reduction of pressure at the valve 70 causes the check valve 88 to immediately open up and release all of the pressure on the pilot drive 12a of the control valve 12, thereby causing the valve to immediately switch to its shut off position wherein the flow of cleansing liquid is blocked. However, blow out air continues to pass through the valve 12 to the back flush input port 50 and thence out through the milk input line 14 and milking claw 102, aiding in voiding any residual liquid within these pieces of equipment, and also drying out the equipment. The slider of the back flush valve is spring biased upwardly and will tend to move in this direction since high pressure air is no longer being supplied to the line 74. However, the air pressure on the cylinder 23 does not immediately drop to atmospheric, since the pressure within the line 74 is slowly vented to the atmosphere through the restrictor 73. As a result, the back flush valve slowly moves up to its neutral position, during which time the blow out air is blowing through the valve and the milking line. As air pressure within the line 74 reaches substantially atmospheric, the milk flow back flush valve 11 reaches its neutral position in which the milking vacuum line and back flush port are blocked at the same time. The air pressure in the air line 75 also returns to atmospheric, allowing the valve 65 to be spring biased back to its open position. The apparatus is now in condition to await restarting of the milking cycle.

It is clear that the back flush timing and control system shown generally at 13 in FIG. 2 can be easily adapted for use with a manual milking system. In such a system, only the valve 105 would be utilized, and would be selectively manually switched by the operator to supply air under pressure to either the start milking line 60 or the stop milking line 61.

MILK FLOW BACK FLUSH VALVE CONSTRUCTION AND OPERATION

Figure 3:
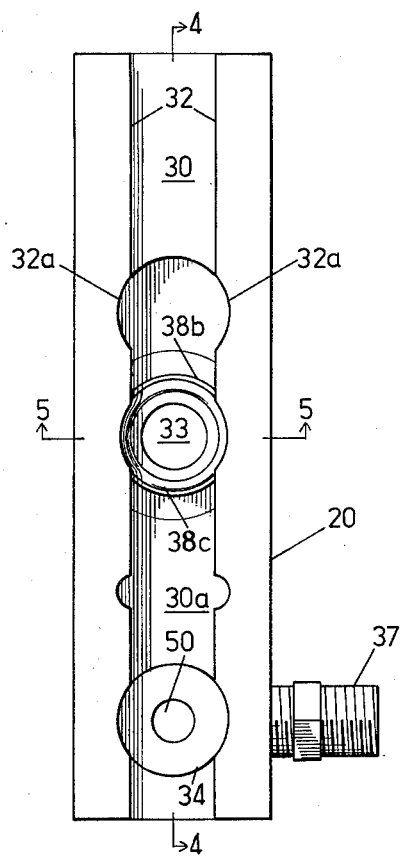
FIG. 3 is a front elevation view of the body of the back flush valve portion of the apparatus.
Figure 4:
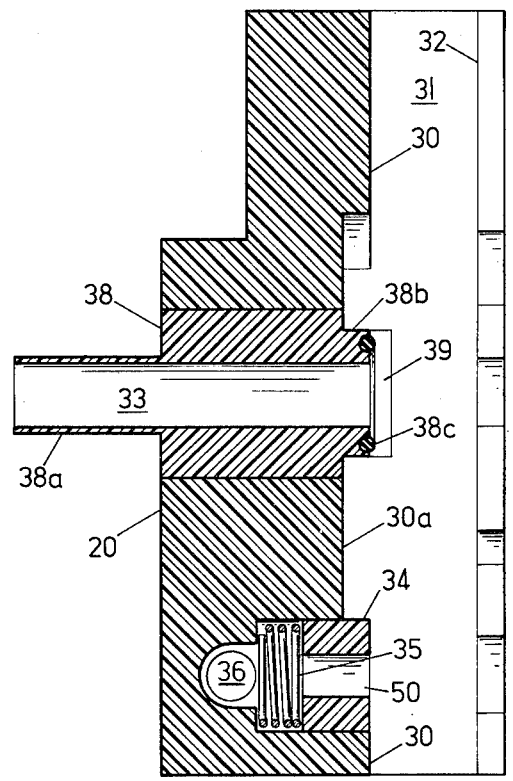
FIG. 4 is a cross-sectional view of the back flush valve body taken along the lines 4—4 of FIG. 3.
Figure 5:
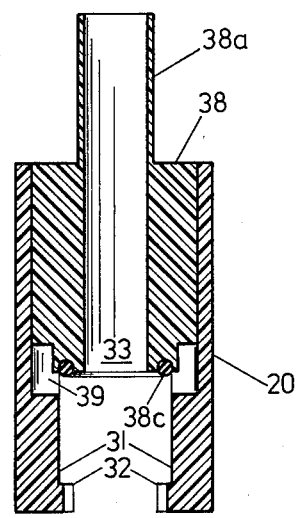
FIG. 5 is a cross-sectional view of the back flush valve body taken along the lines 5—5 of FIG. 3.

The construction of a preferred embodiment of the back flush valve is best illustrated with reference to the views of FIGS. 3–8. A front elevation view of the back flush valve body 20 is shown in FIG. 3 with the slider 21 removed. The body is preferably formed of a solid piece of material which is compatible with milk and the back flushing fluids, such as stainless steel solid high density polyethylene, polystyrene, or similar suitable structural plastic materials. The valve body 20 has an internal longitudinal slot defined by a bottom wall 30, side walls 31, and over hanging ridges 32, which together closely engage the periphery of the slider 21 but allow the slider to move longitudinally. The valve body includes a milk flow output port 33, while the back flush input port 50 is defined by a spring loaded cylindrical Teflon (DuPont name for polytetrafluorethylene) plug 34 which rides up and down in a cylindrical bore in the valve body 20. The plug 34 is spring biased upwardly by a coil spring 35. The back flush input port 50 communicates with a lateral bore 36 in the housing which is itself in communication with the interior of a threaded coupler 37.

The milk flow output port 33 is defined by a one piece machined cylindrical insert 38 which fits tightly in a machine hole in the valve body 20. The insert 38 has an outwardly extending tube portion 38a for connection to the output milk hose, and a raised island portion 38b which extends above an adjacent recessed portion 30a of the bottom wall of the longitudinal slot. The top face of the raised island 38b is substantially flush with the main portion of the bottom wall 30. A rubber O-ring 38c is recessed in a groove around the milk output port 33 to provide a resilient seal to the slider surrounding the output port. A circular recess 39 is provided in the side walls 31 of the slot at the areas adjacent to the raised island portion 38b of the insert 38. The recess 39 is preferably formed by continuing the bore in which the insert 38 is mounted beyond the top surface of the insert, as best illustrated in the cross-sectional view of FIG. 5. The recesses 39 in the side walls of the slot, along with the recessed bottom wall 30a, combine to provide a fail-safe feature of the valve wherein solution from the back flush port cannot be inadvertently introduced into the milking output line, since the milking output port is always blocked except when in communication with the milk line input port. Any back flush liquid under pressure will flow around the raised island portion 38b in the milking position around the upper end of the slider.

Figure 6:
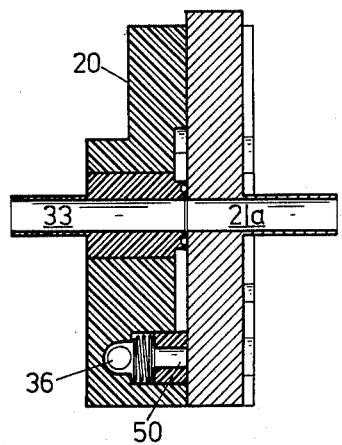
FIG. 6 is a cross-sectional view taken through the back flush valve, showing the slider portion of the back flush valve in the milking position.
Figure 7:
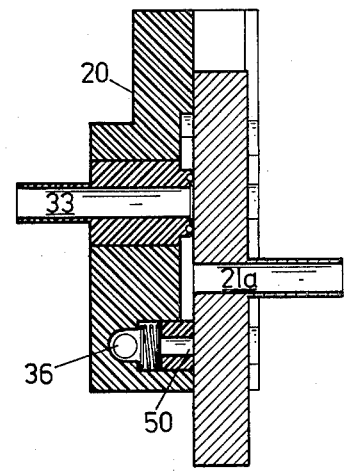
FIG. 7 is a cross-sectional view of the back flush valve with the slider of the valve in the neutral position.
Figure 8:
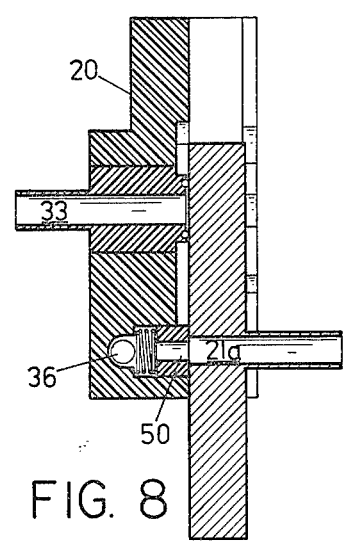
FIG. 8 is a cross-sectional view of the back flush valve with the slider in the back flush position.

The various positions of the valve are shown in the views in FIGS. 6–8. FIG. 6 shows the slider 21 of the valve in the milking position wherein the milk line input port 21a of the slider is in communication with the milk flow output port 33. In FIG. 7, the valve slider is shown in the neutral position in which both the milk flow output port 33 and the back flush input port 50 are blocked by the slider, while the milk line input port 21a is opened to the cavity formed between the walls of the slider and the recessed bottom wall 30a of the valve body slot. The valve slider is shown in the back flush position in FIG. 8, in which the milk line input port 21a of the slider is in communication with the back flush input port 50. Again, it is noted that the milk flow output port 33 is completely sealed off by the walls of the slider such that the back flush fluid cannot migrate into the milking output line. Even if the Teflon valve 34 should stick and not completely seal against the side of the slider, any fluid or air emanating from the back flush port 50 would flow around the raised island 38b and would be exhausted from the valve body around the end of the slider.

CLEANSING LIQUID CONTROL VALVE CONSTRUCTION AND OPERATION

Figure 9:
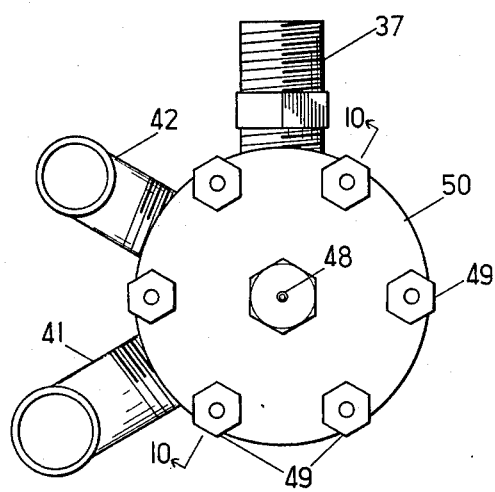
FIG. 9 is a top plan view of the cleansing liquid control valve portion of the apparatus.
Figure 10:
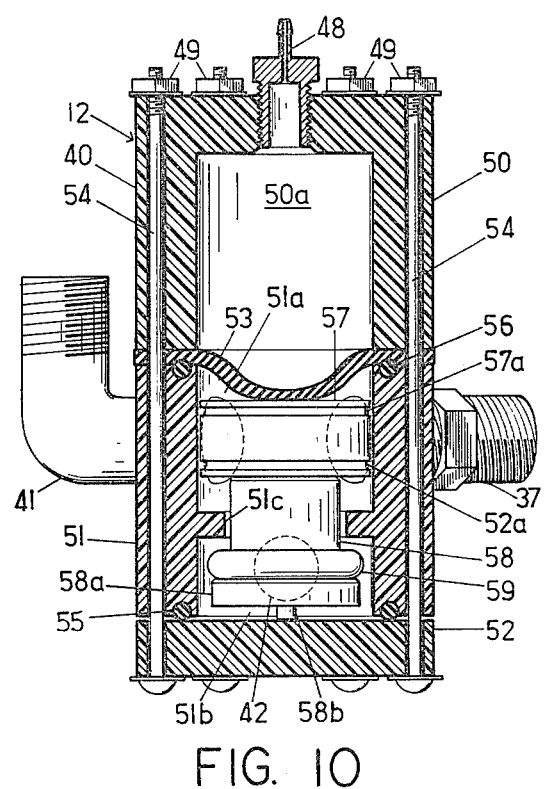
FIG. 10 is a cross-sectional view of the cleansing liquid control valve taken along the lines 10—10 of FIG. 9.

The construction of the cleansing liquid control valve is best shown in the views of FIGS. 9 and 10. FIG. 9 is a top view showing the location of the input and output ports of the valve, including the blow out air input port 41, the cleansing liquid input port 42, and the threaded connector 37 which communicates with the back flush port in the back flush valve. In the preferred embodiment shown, the valve 12 has a substantially cylindrical body 40. The construction of the valve is best shown with respect to the cross-sectional view of FIG. 10. The valve body 40 consists of an upper cup shaped cylindrical housing 50, a lower cylindrical housing 51 open at both ends, and a solid cylindrical plate 52 which closes off the bottom end of the lower housing 51. A flexible rubber diaphragm 53 separates an interior cavity 50a in the upper housing from an interior cavity 51a in the lower housing. The assembly is held together by a plurality of bolts 54 inserted through holes in the various parts and threaded to the nuts 49 at the top end of the valve. The bottom plate 52 is separated and sealed from the lower cylindrical housing 51 by an O-ring 55 which seats in a groove on the lower end of the housing 51 surrounding a lower cylindrical cavity 51b therein. Another O-ring 56 seats in a groove at the top end of the lower housing 51 surrounding the upper cavity 51a to firmly engage the diaphragm 53. The two O-rings 55 and 56 provide a secure seal around the cavities 51a and 51b when the entire assembly has been tightened down firmly by the peripheral bolts 54.

The control input port 48 of the mixing valve 12 has a threaded metal connector which is engaged with the top of the upper housing 50 to provide communication with the cavity 50a in the upper housing 50. Air under pressure introduced through the input orifice 48 will pressurize the cavity 50a above atmospheric, thereby tending to depress the diaphragm 53 into the lower cavity 51a.

Intermediate the ends of the lower cavity 51, an inwardly extending ridge 51c is formed integrally with the lower cylindrical housing 51, thereby dividing the upper cavity 51a from the lower cavity 51b. Within the upper cavity 51a rides a cylindrical piston 57 which is loosely fitted within the walls of the cavity. A lower poppet 59 rides partially within the upper cavity 51a and partially within the lower cavity 51b. The poppet 58 has a cylindrical body with an outwardly extending radial lip 58a at its lower edge and a stub foot 58b extending from the center of its bottom end. A rubber O-ring 59 fits tightly around the body of the poppet 58 and abuts up against the lip 58a. The main body of the poppet 58 is sized to be smaller than the inner circumference of the cylindrical ridge 51c such that the poppet rides loosely within the space defined by the inner circumference of the ridge. The sizing of the various parts is accomplished such that there is a vertical space between the top of the O-ring 59 and the bottom surface of the ridge 51c. The O-ring 59, however, extends radially outward beyond the opening defined by the ridge 51c and is in position to firmly engage against the bottom surface of the ridge when pushed upwardly. The back flush cleansing liquid input opening 42 is formed in the walls of the lower cavity 51b just below the position of the lip 51c. It is thus seen that when the poppet rises such that the O-ring 59 seals against the ridge 51c, the cleansing liquid passing from the opening 42 will be sealed off from the upper cavity 51a.

The piston 57 preferably has peripheral grooves 57a as shown to enhance turbulance within the upper cavity 51a. The air input opening from the blow out air port 41, and the output opening in communication with the coupler 37, are spaced to be partially covered although not blocked by the piston 57. The piston rides freely within the upper cavity 51a and is not connected to the poppet 58.

The valve 12 is structured such that blow out air entering through the input port 41 will be allowed to pass into the coupler 37 at all times. However, the cleansing liquid entering through the port 42 will tend to force the poppet 58 upwardly to firmly seal the O-ring 59 against the bottom edge of the ridge 51c. The foot 58b supports the bottom of the poppet above the bottom plate 52 such that there will be a differential in pressure across the poppet which will tend to keep the poppet closed when no counter balancing force is provided to the top of the poppet. For example, the pressure of the blow out air provided through the blow out input port 41 will be in the range of approximately 20 psig., whereas the back flush liquid will generally be under a static pressure of approximately 40 psig.

The back flushing cycle is initiated when a pressure control signal is received at the control input 48 from the air control system portion 13 of the apparatus. The stop milking air pressure signal received at the input line 61 passes through the restrictor 71 to the input port 48. For the operational pressures within the valve 12 which are described above, satisfactory operation can be obtained with control input pressures in the range of approximately 70 psig. Eventually, air passing through the restrictor 71 builds up air pressure within the upper cavity 50a sufficient to drive the diaphragm 53 downwardly and exert pressure on the piston 57 which is transmitted to the poppet 58. When the air pressure within the cavity 50a exceeds the static pressure on the poppet 58, the poppet will be driven downwardly and cleansing liquid will be allowed to pass through the space between the inside circumference of the ridge 51c and the main body of the poppet 58. This liquid will squirt up and be caught in the air stream from the blow out air input 41, and will be delivered out through the connector 37 to the back flush input port. The mixing of the liquid and the air within the chamber 51a occurs vigorously, and is aided by the provision of the piston 57 and the grooves 57a therein, which force liquid to pass through the narrow spaces between the edges of the piston and the interior walls of the cavity 51a. This vigorous mixing of liquid and air is highly desirable, since it provides a vigorous scrubbing action as the droplets of liquid are blown through the system by the blow out air, as well as reducing the amount of solution required.

Where it is desired to simply provide a cleansing liquid alone, such as water to clean out the milking claw and teat cup cluster, the valve described above can be simply modified to accomplish this function. For example, the elbow connector forming the blow out air input port 41 can be unscrewed from the valve housing, and a plug can be inserted in its place. In this situation, only cleaning liquid would pass through the valve and into the back flush line input port.

It is understood that the invention is not confined to the particular construction and arrangement of parts herein illustrated and described, but embraces all such modified forms thereof as come within the scope of the following claims.

I claim:

1. Apparatus for flushing the milking claw and teat cup inflations with a cleansing liquid after milking, comprising:
   (a) a milk flow back flush valve adapted to be connected to a milk input line from the milking claw and to a milk output line to the milking vacuum, and having a back flush input port at which it receives cleansing liquid, said back flush valve being responsive to control signals to switch between:
      (1) a milking position, in which the milk input line is in communication with the milk output line and the back flush input port is blocked,
      (2) a neutral position in which the back flush input port and the milk output line are both blocked, and
      (3) a back flush position in which the back flush input port is in communication with the milk input line and the milk output line is blocked;
   (b) a cleansing liquid control valve receiving cleansing liquid and blow out air under pressure, and having an output connected to the back flush input port of said back flush valve, said cleansing liquid control valve being responsive to a control signal to supply a mixture of cleansing liquid and blow out air to the back flush input port and for providing blow out air alone to the back flush input port when the control signal is not received;
   (c) timing and control means connected to said back flush valve for providing a control signal thereto to switch said valve to its milking position at the initiation of milking, for providing a control signal to said back flush valve a selected period of time after milking has terminated to switch said back flush valve to its back flush position, and for providing a control signal to said back flush valve to switch said valve to its neutral position a selected period of time thereafter, whereby the apparatus is reset for initiation of another milking cycle, and wherein said timing and control means further includes means for providing a control signal to said cleansing liquid control valve when said back flush valve has been switched to its back flush position, and for removing the control signal from said cleansing liquid control valve a selected period of time thereafter and before said back flush valve has been switched to its neutral position.

2. The apparatus of claim 1 wherein said cleansing liquid valve comprises:
   (a) a housing having a cavity enclosed therein, said housing having an upper portion and a lower portion separated by a flexible diaphragm to define an interior pressure cavity in the upper portion of the housing, and a ridge extending radially inward in the cavity in the lower portion of said housing to separate the cavity therein into an upper cavity and a lower cavity, the upper cavity in said lower housing having walls therein defining a blow-out air input port and walls therein defining an opening which is in communication with the back flush input port in said back flush valve, the lower cavity in said lower housing having walls therein defining an opening for receiving cleansing liquid under pressure, said cavity in said upper housing having an orifice therein to which the air pressure control signal can be provided;
   (b) a poppet situated in said cavity in said lower housing in position to be forced upwardly by cleansing liquid under pressure from the cleasing liquid opening to seal against the ridge extending from the interior walls of said lower housing to prevent the flow of cleansing liquid from the lower cavity in said lower housing to the upper cavity in said lower housing;
   (c) a piston freely moveable in the upper cavity in said lower housing between said poppet and said diaphragm, said piston being placed in position to be pressed upon by said diaphragm when pressure is exerted in the cavity in said upper housing and to transmit the pressure from said diaphragm to said poppet valve to open the same to allow cleansing liquid to flow into said upper cavity and thereby be mixed with blow out air entering from the blow out air input opening.

3. Apparatus for flushing the milking claw and teat cup inflations with a cleansing liquid after milking, comprising:
   (a) a milk flow back flush valve adapted to be connected to a milk input line from the milking claw and to a milk output line to the milking vacuum, and having a back flush input port at which it receives cleansing liquid, said back flush valve comprising:
      (1) a valve body having walls defining a longitudinal slot therein, and walls therein defining a back flush input port and a milk flow output port both opening onto the slot in said valve body, said milk flow output port being connectable to the milk output line,
      (2) a slider longitudinally slidable in said slot and normally blocking the back flush input port and milk flow output port of said valve body, said slider having walls therein defining a milk line input port positioned to selectively communicate with the back flush input port or milk flow output port as said slider is moved longitudinally in said valve body slot, said milk line input port being connectable to the milk input line,
      (3) a two-way power air cylinder having the piston thereof connected by a shaft to said slider to drive the same longitudinally, and a spring mounted so as to urge said slider from its back flush position to its neutral position, said air cylinder having a rearward air pressure input which, when provided with air under pressure drives the slider to its milking position, and having a forward air pressure input which, when provided with air under pressure, drives said slider through its neutral position to its back flush position,
      said back flush valve being responsive to air pressure control signals to switch between a milking position, in which the milk output line and the back flush input port is blocked, a neutral position in which the back flush input port and the milk output line are both blocked, and a back flush position in which the back flush input port is in communication with the milk input line and the milk output line is blocked; and
   (b) timing and controls means connected to said back flush valve for providing a control signal thereto to switch said valve to its milking position at the initiation of milking, for providing a control signal to said back flush valve a selected period of time after milking has terminated to switch said back flush valve to its back flush position, and for providing a control signal to said back flush valve to switch said valve to its neutral position a selected period of time thereafter, whereby the apparatus is reset for initiation of another milking cycle.

4. The apparatus of claim 3 wherein said back flush input port and milk flow output port open onto a bottom wall of the slot in said valve body, and wherein a portion of the bottom wall of said valve body is recessed in an area surrounding said milk flow output port, and wherein said sealing means are provided surrounding said back flush input port and said milk flow output port for providing a firm sliding seal to said slider, whereby any cleansing liquid inadvertently forced out of said back flushing input port when it is not in communication with said milk line input port will flow into the cavity formed between said slider and the recessed bottom walls of said valve body without entering the milk flow output port.

5. The apparatus of claim 3 including a frame member mounted to said valve body and said air cylinder and spacing the same apart, a shaft extending from said air cylinder and connected to the piston thereof to connection with said slider to slide the same longitudinally with motion of said shaft, a coil spring mounted around said shaft and extending a portion of the length of said shaft, and a flange rigidly mounted on said shaft in position to engage said spring and compress the same when said shaft has extended a portion of its extension length as said shaft is moving said slider from the neutral position to the back flush position, wherein when pressure on said cylinder is released, said spring will force said shaft and slider attached thereto upwardly until said slider is in its neutral position.

6. Apparatus for flushing the milking claw and teat cup inflations with a cleansing liquid after milking, comprising:
 (a) a milk flow back flush valve adapted to be connected to a milk input line from the milking claw and to a milk output line to the milking vacuum, and having a back flush input port at which it receives cleansing liquid, said back flush valve being responsive to air pressure control signals to switch between:
  (1) a milking position, in which the milk input line is in communication with the milk output line and the back flush input port is blocked,
  (2) a neutral position in which the backflush input port and the milk output line are both blocked, and
  (3) a back flush position in which the back flush input port is in communication with the milk input line and the milk output line is blocked; and
 (b) air pressure operated timing and control means adapted to receive a first high pressure air signal indicative of the start of milking, and a second high pressure air signal indicative of the cessation of milking, and for providing a high pressure air signal to said backflush valve to drive the same into said milking position at the start of milking and to release the pressure after milking has ceased, to provide a high pressure signal to said milk flow back flush valve to drive the same to its back flush position after said timing and control means receives the high pressure signal indicative of the cessation of milking, and to release the pressure signal a selected period of time later to allow said backflush valve to switch to its neutral position, whereby the apparatus is reset for initiation of another milking cycle.

7. The apparatus of claim 6 including an air pressure power cylinder adapted to detach the teat cup cluster from the cow when air pressure is provided thereto in its retract direction, and detaching sensing and control means for receiving an air pressure signal under pressure and providing an air pressure signal to said back flush timing and control means at the start of milking, and for sensing the flow of milk from the cow during milking, and providing an air pressure signal to said detacher air power cylinder to drive the same in a direction to detach the teat cup cluster when milk flow has substantially ceased and to provide an air pressure signal at the same time to said back flush timing and control means.

8. A milk line back flush valve responsive to air pressure control signals and connectable to a milk input line from the milking claw and a milk output line to the milking vacuum, comprising:
 (a) a valve body having walls defining a longitudinal slot therein, and walls therein defining a back flush input port and a milk flow output port both opening onto the slot in said valve body, said milk flow output port being connectable to the milk output line;
 (b) a slide longitudinally slidable in said slot and normally blocking the back flush input port and milk flow output port of said valve body, said slider having walls therein defining a milk line input port positioned to selectively communicate with the back flush input port or milk flow output port as said slider is moved longitudinally in said valve body slot, said milk line input port being connectable to the milk input line,
 (c) a two-way power air cylinder having the piston thereof connected by a shaft to said slider to drive the same longitudinally, and a spring mounted so as to urge said slider from its back flush position to its neutral position, said air cylinder having a rearward air pressure input which, when provided with air under pressure drives the slider to its milking position, and having a forward air pressure input which, when provided with air under pressure, drives said slider through its neutral position to its back flush position.

9. The apparatus of claim 8 wherein said back flush input port and milk flow output port open onto a bottom wall of the slot in said valve body, and wherein a portion of the bottom wall of said valve body is recessed in an area surrounding said milk flow output port, and wherein said sealing means are provided surrounding said back flush input port and said milk flow output port for providing a firm sliding seal to said slider, whereby any cleansing liquid inadvertently forced out of said back flushing input port when it is not in communication with said milk line input port will flow into the cavity formed between said slider and the recessed bottom walls of said valve body without entering the milk flow output port.

10. The apparatus of claim 8 including a frame member mounted to said valve body and said air cylinder and spacing the same apart, a shaft extending from said air cylinder and connected to the piston thereof to connection with said slider to slide the same longitudinally with motion of said shaft, a coil spring mounted around said shaft and extending a portion of the length of said shaft, and a flange rigidly mounted on said shaft in position to engage said spring and compress the same when said shaft has extended a portion of its extension length as said shaft is moving said slider from the neutral position to the back flush position, wherein when pressure on said cylinder is released, said spring will force said shaft and slider attached thereto upwardly until said slider is in its neutral position.

11. An air pressure signal operated cleansing liquid control valve comprising:
(a) a housing having a cavity therein, said housing having an upper portion and a lower portion separated by a flexible diaphragm to define an interior pressure cavity in the upper portion of the housing, and a ridge extending radially inward in the cavity in the lower portion of said housing to separate the cavity therein into an upper cavity and a lower cavity, the upper cavity in said lower housing having walls therein defining a blow-out air input port and walls therein defining an opening which is in communication with the back flush input port in said back flush valve, the lower cavity in said lower housing having walls therein defining an opening for receiving cleansing liquid under pressure, said cavity in said upper housing having an orifice therein to which the air pressure control signal can be provided;
(b) a poppet situated in said cavity in said lower housing in position to be forced upwardly by cleansing liquid under pressure from the cleansing liquid opening to seal against the ridge extending from the interior walls of said lower housing to prevent the flow of cleansing liquid from the lower cavity in said lower housing to the upper cavity in said lower housing;
(c) a piston freely moveable in the upper cavity in said lower housing between said poppet and said diaphragm, said piston being placed in position to be pressed upon by said diaphragm when pressure is exerted in the cavity in said upper housing and to transmit the pressure from said diaphragm to said poppet valve to open the same to allow cleansing liquid to flow into said upper cavity and thereby be mixed with blow-out air entering from the blow-out air input opening.

* * * * *